May 26, 1936.　　　　　R. ERICSON　　　　　2,041,911
HEAT INSULATION
Filed May 25, 1935　　　3 Sheets-Sheet 1
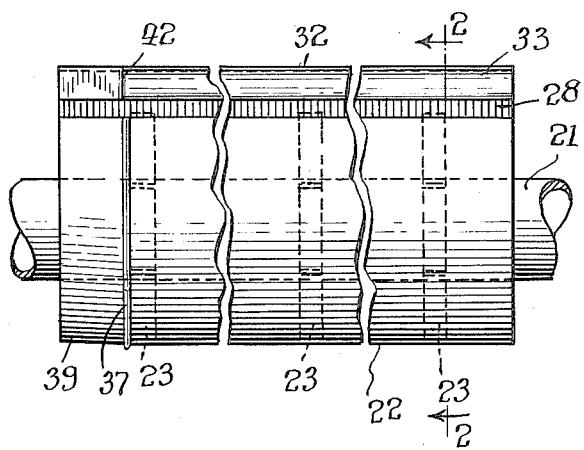
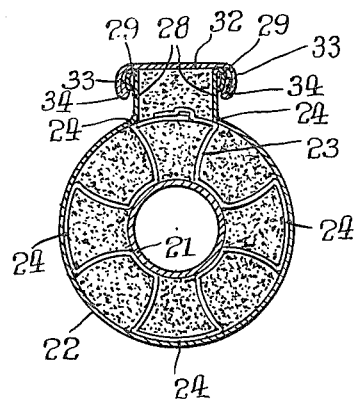
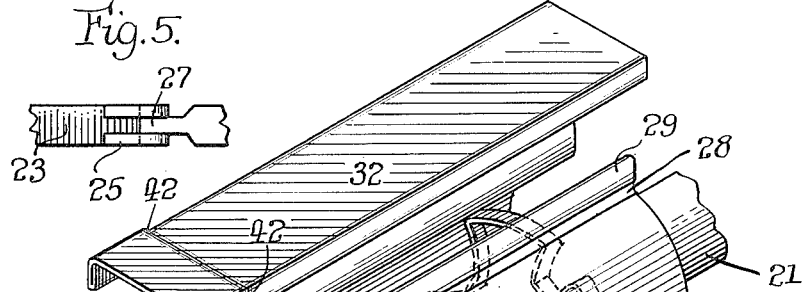
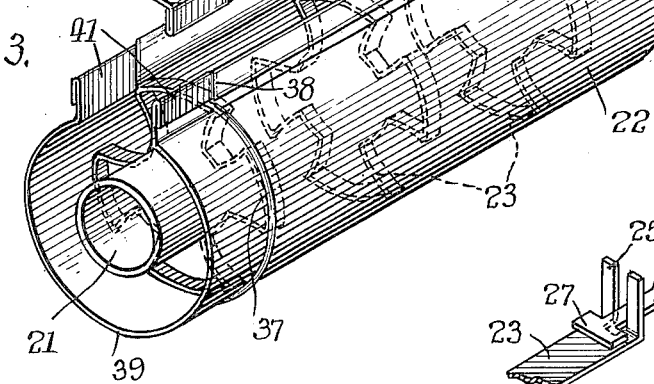
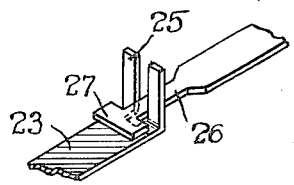
Inventor:
Richard Ericson
By Walter M. Fuller
Atty.

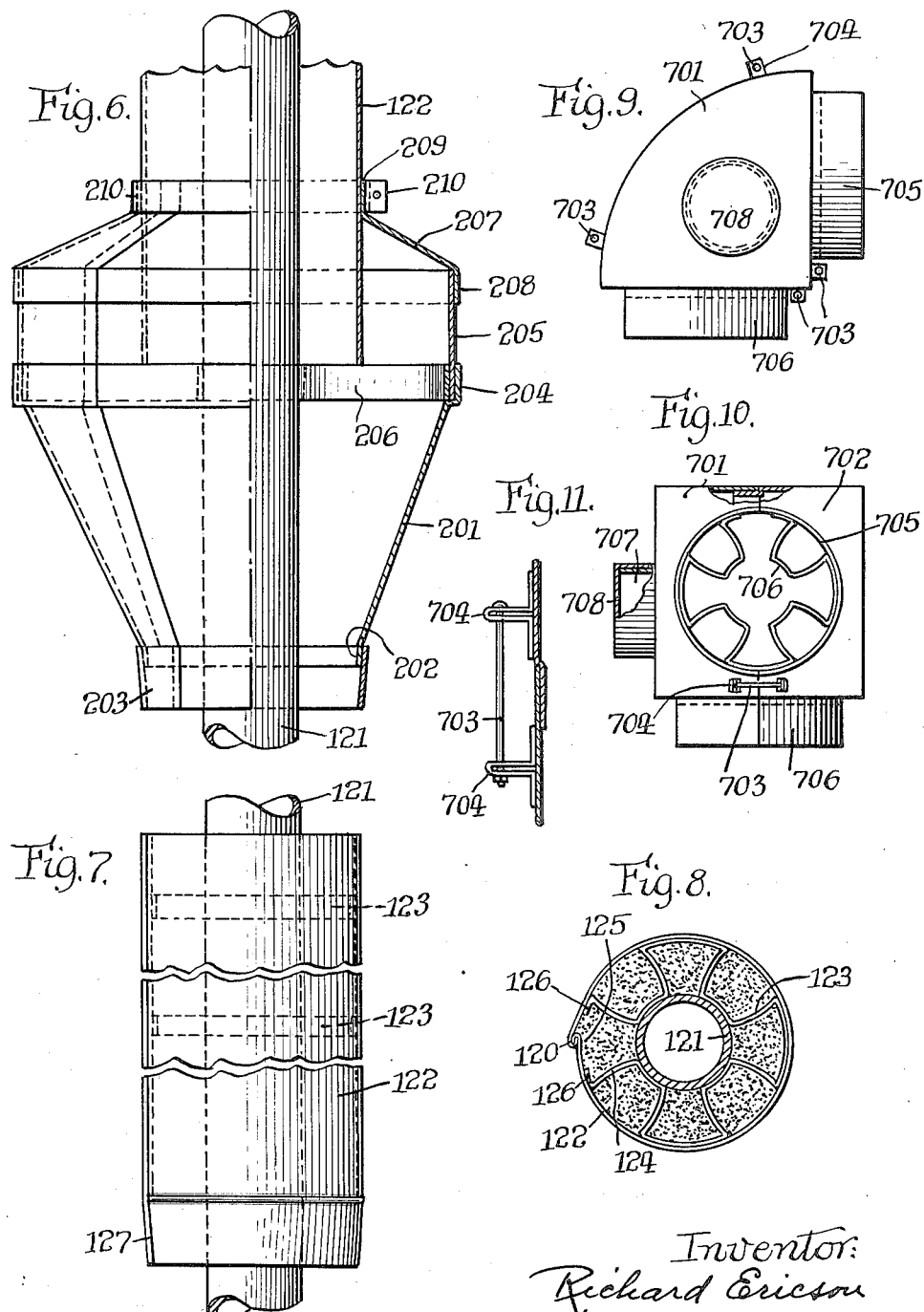

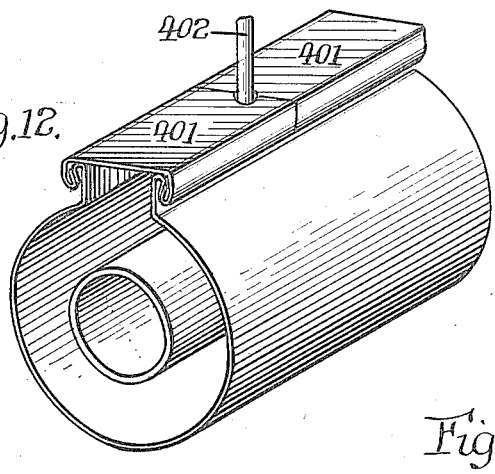
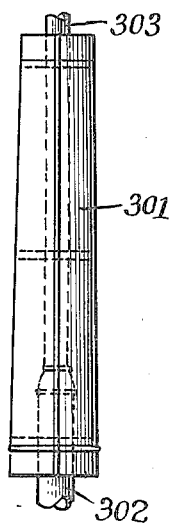
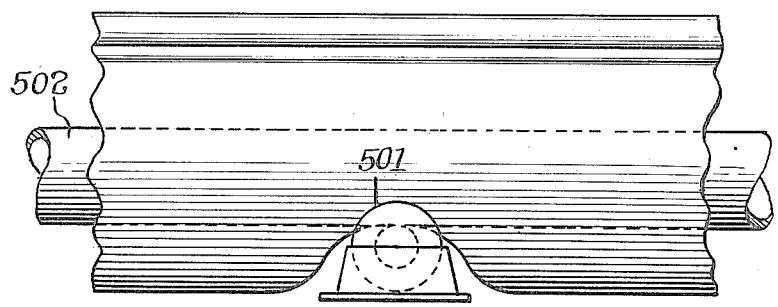
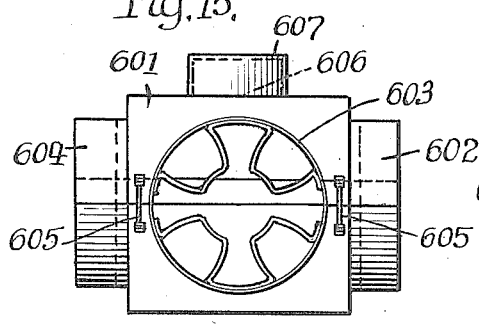
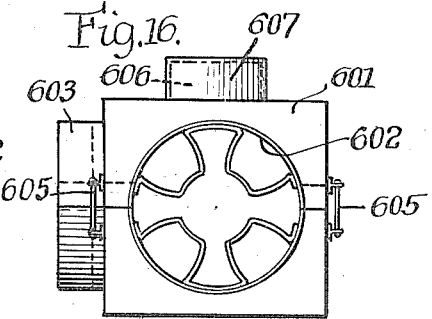
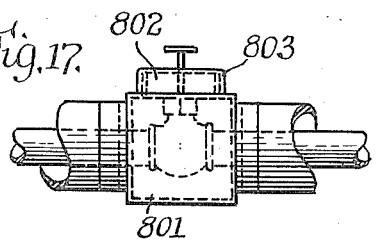

UNITED STATES PATENT OFFICE 2,041,911

HEAT INSULATION

Richard Ericson, Chicago, Ill., assignor to Universal Insulation Company, Chicago, Ill., a corporation of Illinois Application May 25, 1935, Serial No. 23,471

6 Claims. (Cl. 154—44)

The present invention concerns features of betterment and advantage in the heat insulation of pipes, conduits, cables, and the like, and relates more particularly to structures of this character employing a loose or granular type of insulating material encased in an enclosing sheath or shell.

The present standard method of insulating pipes, etc., especially those carrying high-pressure steam, is to encompass or surround the pipe with two or more companion or mating pre-formed cast sections of about 85% magnesia and to encircle them with confining fabric, the sections being held together and prevented from separation by metal bands or straps.

One object of the new invention is to provide a novel method and means for insulating such conduits whereby (a) to secure a greater degree of heat insulation for a given thickness of material used than has heretofore been possible, (b) to provide means for insulating a rather high temperature in that the granular insulating agent at present employed by this inventor, such as expanded or exfoliated vermiculite, may be satisfactorily used for insulating temperatures of 2000° Fahrenheit without damage to the insulation, (c) to supply an insulating structure having a strong, smooth, non-absorbent exterior surface which can be easily and economically coated or painted for protection against the atmosphere, and (d) to involve a low cost for material and installation labor.

A further aim or purpose of the invention is to provide a metallic casing for enclosing the puffed vermiculite-type insulation around the fluid-conveying conduit in either a horizontal or vertical position.

To enable those acquainted with this art to understand the invention fully both from structural and functional standpoints, present preferred embodiments of the invention have been illustrated in the accompanying drawings forming a part of this specification and to which reference should be had in connection with the following detailed description, like reference numerals having been employed to designate the same parts of the structure throughout the several views.

In these drawings:—

Figure 1 illustrates in broken side-elevation one section of one type of the improved heat-insulating structure, such as is adapted to be employed for a horizontal pipe;

Figure 2 is a vertical cross-section through the same;

Figure 3 is a perspective view of the same structure with some of the parts separated from one another to more clearly illustrate their construction;

Figures 4 and 5 show details of the ends of the fasteners or supports used inside of the metallic-casing;

Figures 6 and 7 conjointly present the invention as applied to an upright pipe, Figure 6 being partially in section and partially in elevation;

Figure 8 is a top plan view of the structure presented in Figure 7;

Figures 9, 10, and 11 depict the invention as applied to an elbow;

Figure 12 shows the invention as employed in connection with a pipe having a pipe-support;

Figure 13 indicates how changes are made in the insulating structure to accommodate variations in the pipe diameter;

Figure 14 illustrates how the enclosing shell for the insulation is used in connection with roller-supports for steam-pipes;

Figures 15 and 16 show the improved insulating means applied to a T; and

Figure 17 represents the use of the principle of the invention as associated with a valve.

Referring first to Figures 1 to 5, inclusive, it will be perceived that the straight horizontal pipe 21 is enclosed in a sheet-metal casing or shell 22 which for its major portion is of cylindrical form, such casing being mounted on a plurality of internal supports 23, 23 spaced longitudinally of the casing and each comprising a narrow strip of thin spring-metal bent into general cruciform shape, as presented in Figures 2 and 3, with its outer portions curved to conform substantially to the internal diameter of the casing which they support and with its inner portions curved to agree approximately with the external shape of the pipe 21.

Each such cruciform support is welded or otherwise fastened to the inner surface of the casing at the points 24, 24, and one end of each such support is shaped as a slotted hook 25 and the opposite end has a tongue 26 with a cross-head 27, the hook 25 being adapted to be bent over as shown in Figure 5 to draw and to secure the two ends of the support firmly and securely together.

These bands or supports are more or less elastic and they are so shaped that, when their ends are thus fastened together, they will firmly grasp the pipe on which they are mounted and will prevent the enclosing casing from turning relatively to the pipe.

As is fully illustrated, the two longitudinal marginal portions of the sheet-metal shell or casing are turned outwardly in parallelism as flanges 28, 28, well spaced apart from one another and the edge portions of such flanges are bent outwardly and inwardly, forming long, somewhat resilient, hollow beads or marginal ribs 29, 29.

A sheet-metal cover 32 of approximately the length of the casing-section has its lengthwise marginal sections bent at right-angles to the body of the cover to provide longitudinal flanges 33, 33 equipped internally with somewhat elastic or resilient hollow beads or ribs 34, 34.

From what precedes, it will be clear that the metal-casing as a whole including its united internal supports is longitudinally split, and, before the ends of the supports are hooked or fastened together, the composite structure may be opened up sufficiently to apply it and its supports over the pipe 21, whereupon the casing is contracted about the pipe so that its members 23 firmly clasp the pipe and prevent movement thereon, such contracting clamping of the bands being facilitated by the nature of the securing means at their ends.

After the pipe has been covered with the required number of such sections of casing or shell aligned thereon, with their lengthwise openings in register at the top of the pipe, they are filled through such openings with any type of appropriate granular insulating material, preferably, but not necessarily, expanded or exfoliated vermiculite.

The pipe and casing are thereupon jarred to settle the vermiculite in the latter whereby to prevent as much as possible any subsequent settling taking place, and the casing is again completely filled.

In order to have a continuity of insulation along the length of the pipe, a short overlap is provided for each enclosing section, and this is effected by crimping one end of each section at 37, 38 to provide a curved end part 39 of slightly reduced diameter and upstanding portions or flanges 41, 41 offset inwardly in minor degree and slightly out of register with the flanges 28, and the beads or ribs 29 and 34 are flattened for a corresponding length of the casing section.

The flanges of the cover are similarly crimped outwardly at 42, 42 and their external ribs flattened accordingly.

Thus, when adjacent sections of the casing are assembled, they and their covers will overlap to a certain extent.

The associated or companion casing-sections having been filled with the granular insulating material up to the top of the flanges 28, 28 and the cover-sections 32 having been put in place, more or less of the insulating medium above the normal circular contour of the enclosing casing will automatically gradually descend by gravity into the main cylindrical body of the casing to compensate for any settling of this material thereafter.

Turning now to a consideration of the construction for insulating a vertical pipe 121, as shown in Figures 6, 7, and 8, it will be noticed that the structure illustrated in Figures 7 and 8 is much the same as that already described except that in this instance the cruciform supports or spacers 123 are not quite complete circles around their peripheries in that one arm 124 of each cross has a gap 125.

As in the other case, the arms of the cross and also its two ends 126, 126 are welded, soldered, or otherwise fastened to the inner face of the casing.

In this construction, however, instead of having the fastening means on the cross-shaped supports, they are provided along the adjacent or meeting lengthwise edges of the sheet-metal casing 122, such casing, in this instance, being practically completely cylindrical and without outstanding flanges.

As is indicated in Figure 8, the margins of the casing are overlapped and bent into interlocking engagement which permits quick fastening of the enclosing member around the pipe.

Of course, any other manner of securing the edges of the sheets together, such as that used for stove pipes, may be employed.

The joints between the several aligned sections of casing in vertical installations are provided by crimping one end of each at 127 for insertion in the full-size end of the next section, as is common practice in any cylindrical sheet-metal conduit structures.

The insulation material may be introduced in the vertical installation shown in Figure 7 by means of any elbow or T units located above the vertical casing to be filled and which are described hereinafter, or by means of the special structure illustrated in Figure 6 which is designed not only to facilitate the original feeding of the insulating agent into the enclosure but also to provide a reservoir for additional insulating material to compensate for the settling of the insulation fill whenever such is needed.

This reservoir or supply-member comprises a downwardly-converging, sheet-metal, conical part 201 having a cylindrical flange 202 at its lower end around which a tapered ring 203 is fitted and of such size as to be accommodated in the upper end of one of the casing-sections 122, the member 201 having a cylindrical flange 204 at its upper larger end around and in which is fitted a cylindrical sheet-metal shell-section 205.

Inside of flange 204 and spacing the sheet-metal structure from the pipe 121 is one of the cruciform supports or spacers 206 of the general style shown in Figure 2 or Figure 8.

The top of shell member 205 is adapted to be closed by a sloping or conical sheet-metal cover 207 having a marginal flange 208 fitted over the top edge of element 205, a center aperture through the cover having around its margin an upstanding circular flange 209 of approximately the same internal diameter as the external diameter of the part 122.

The lower end of the next higher casing-section 122 is adapted to extend through the cover 207 and to bear on the top edge of the support or spacer 206, an expansible-and-contractible split-ring clamp or band 210 being provided around flange 209 to hold the parts firmly together in assembled relation.

One or more of these reservoirs 201, 205 may be associated or connected with each vertical pipe and, in filling the reservoir and the casing below it with the distended or expanded granular vermiculite, it is advisable to settle such material in place by severely jarring or shaking the pipe and then refilling the space left free of insulation by such vibration.

If subsequent settling of the insulating medium occurs, it will be automatically offset or compensated for by the material in the reservoir flowing down by gravity into the casing or shell below it.

If at any time further material is required, the supply-tank cover 207 may be raised and the additional insulating-agent introduced.

Figure 13 illustrates how changes are made for variations in vertical or horizontal pipe diameter by introducing a reducing unit 301 which consists of a sheet-metal conical section of suitable length with its two terminal diameters of proper size to conform to the variation in the pipe diameters.

That is to say, the reducing casing element 301 fits over the ends of the two pipes 302 and 303 of different sizes, the casing being filled with the insulating material as in the other instance.

Figure 12 shows a modification in the horizontal enclosing construction where pipe supports or the like are employed, and in this instance the adjacent ends of the cover-sections 401, 401 are cut away for the accommodation of the pipe support or hanger 402.

On the other hand, Figure 14 shows how the enclosing section for horizontal pipes is applied around a roller-support 501 for a steam-pipe 502.

Figures 15 and 16 illustrate the manner of insulating around T's, the enclosure in such a case comprising a box-like structure 601 placed around the fitting with circular openings 602, 603, 604 for fitting around the pipe and for attachment of the adjoining insulation enclosing units.

These two figures illustrate a horizontally-divided construction, the two parts of which are fastened together in mating relation by suitable clamps 605, 605, and the enclosed space around the T (not shown) is filled through a top opening 606 provided with a protecting cap 607 to shield the insulating material from the elements.

For vertical T's the space may be filled with the insulating agent from above in the manner hereinbefore described in connection with vertical pipes.

This same construction may be employed for insulating around elbows, in which case one of the outlets must be covered with a cap.

In the construction of Figures 15 and 16 the bearing of the inner supports is made on the pipe in the same manner as described for the insulation of regular pipe lengths referred to in the foregoing part of this description, and wherever these fittings are placed around vertical pipes they can be used as affording an opening for filling the spaces below them if it is found expedient to do so.

Figures 9, 10, and 11 illustrate how the method described above in connection with T's can be somewhat modified for insulation around elbows, and in such an instance the casing is composed of two interfitted parts 701 and 702 held in assembled relation by a plurality of bolts or clamps 703 extended through holes in brackets 704 on the exterior of the structure, the composite casing having outlet openings and their flanges 705, 706 at right-angles to one another for association or connection with straight casing sections.

As in the other example, such shell or casing is held on and in spaced relation from the enclosed elbow by cruciform supports 706 and at the top or at one side of the casing there is an opening 707 provided with a cap 708 and through which the insulating material may be introduced into the structure.

The same principle has been illustrated in Figure 17 for insulating around a valve or the like, wherein the upper circular portion 802 of the box-like enclosure 801 has the valve-stem extended therethrough, the insulating material, such as the expanded vermiculite referred to, being inserted through this opening and the cap 803 applied over the opening for protection, a hole being made in the cap for the valve-stem to project through, all as will be readily understood.

From the foregoing descriptions, those skilled in the art of working sheet-metal and familiar with the insulating of conduits can readily apply the indicated principles and make further alterations in design for various situations and for other types of material, and in commercially carrying out the application of such principles of the invention, the sections, fittings, etc. can be ordered from the manufacturer or made up for each particular job, as in the matter of electrical or plumbing fixtures.

Whereas the descriptions relate to metal casings and expanded vermiculite, it is to be understood that other materials for enclosure and insulation may be used as well as other designs without departing from the essence of the invention, and, as an example of other alternative methods embodying the salient features, a treated fabric, paper, or moulded material or any rigid structure may be used for the enclosing element and for the insulating material, blast-furnace slag, ground cork, diatomaceous earth, granular mineral wool, and other flowable insulation medium may be used, the term "flowable" being employed to refer to those types of insulating agents which are composed of distinct particles rendering them possible of distribution by flowing or pouring into the described containers.

Other sectional shapes for the enclosing casing, such as oblong, square, elliptical, or polygonal forms may be used and still be within the scope of the invention.

The reference to loose insulating material is not to be taken as limiting the state of the insulation material after introduction, since loose insulating means may be so prepared that subsequent to its introduction by flowing it into place in the casing it will form a bonded mass, and for certain uses such flowably-introduced insulating material bonded in situ is extremely desirable.

Such a method and means of insulating pipes will find ready application in large industries having pipe-lines in which hot or cold fluids are transported and which it is desirable or essential to have adequately insulated.

I claim:

1. In a heat-insulating system for a conduit, the combination of a casing adapted to be positioned around the conduit at a distance therefrom and to accommodate a body of flowable solid heat-insulating particles occupying the space between the conduit and the casing, and a supplemental chamber adapted to accommodate a reserve supply of the heat-insulating material in direct communication with the interior of the casing, whereby the material from said supplemental chamber may feed by gravity into said casing to compensate for the settling of the heat-insulating material therein.

2. In a heat-insulating system for a conduit, the combination of a casing adapted to be positioned around the conduit at a distance therefrom and to accommodate a body of flowable solid heat-insulating particles occupying the space between the conduit and the casing, and a supplemental chamber adapted to surround the conduit and to accommodate a reserve supply of the heat-insulating material in direct communication with the interior of the casing, whereby the material from said supplemental chamber may feed by gravity into said casing to compensate for the settling of the heat-insulating material therein.

3. The structure presented in claim 1 in which the casing and the supplemental chamber are occupied by heat-insulating exfoliated vermiculite.

4. The structure presented in claim 2 in which the casing and the supplemental chamber are occupied by heat-insulating exfoliated vermiculite.

5. In a heat-insulating system, the combination of a conduit, a longitudinally-split resilient sheet-metal casing surrounding said conduit at a distance therefrom, split elastic metal supporting members inside of and attached to said casing and maintaining the casing spaced away from the conduit by grasping the conduit, means to secure the ends of said supporting members together to hold the members in contracted condition and to hold the casing on the conduit, said casing being shaped to provide a reservoir in its upper portion in direct communication with the interior of the casing, and exfoliated vermiculite filling said casing and occupying said reservoir and adapted to descend by gravity from the reservoir into the body of the casing to compensate for the settling of the vermiculite therein.

6. In a heat-insulating system for a conduit, the combination of a longitudinally-split resilient sheet-metal casing adapted to be applied to the conduit to surround the same at a distance therefrom, split elastic metal supporting members inside of and attached to said casing and adapted to maintain the casing spaced away from the conduit by grasping the conduit, means to secure the ends of said supporting members together to maintain the members in contracted condition and to hold the casing on the conduit, the latter being adapted to be filled with heat-insulating material after application to the conduit, said casing being shaped to provide a reservoir at the upper portion of the casing in direct communication with the interior of the casing and adapted to hold a reserve supply of the heat-insulating material capable of descent by gravity into the main body of the casing to compensate for the settling of the heat-insulating material.

RICHARD ERICSON.